United States Patent
Nichols et al.

(10) Patent No.: US 6,185,206 B1
(45) Date of Patent: Feb. 6, 2001

(54) ATM SWITCH WHICH COUNTS MULTICAST CELL COPIES AND USES A SECOND MEMORY FOR A DECREMENTED CELL COUNT VALUE

(75) Inventors: Stacy W. Nichols, Kanata; David A. Brown, Carp; David G. Stuart, Almonte, all of (CA)

(73) Assignee: Nortel Networks Limited (CA)

( * ) Notice: Under 35 U.S.C. 154(b), the term of this patent shall be extended for 0 days.

(21) Appl. No.: 08/994,792

(22) Filed: Dec. 19, 1997

(51) Int. Cl.[7] .............................. H04L 12/28; H04L 12/56
(52) U.S. Cl. ............................. 370/390; 370/395
(58) Field of Search .................................... 370/395, 390, 370/392, 252, 253, 428, 412, 413

(56) References Cited

U.S. PATENT DOCUMENTS

| | | | |
|---|---|---|---|
| 5,111,385 | * 5/1992 | Hattori | 711/157 |
| 5,724,358 | * 3/1998 | Headrick et al. | 370/418 |
| 5,875,189 | * 2/1999 | Brownhill et al. | 370/395 |
| 5,903,564 | * 5/1999 | Ganmukhi et al. | 370/399 |
| 5,917,819 | * 6/1999 | Yang et al. | 370/390 |
| 6,009,078 | * 12/1999 | Sato | 370/232 |

* cited by examiner

*Primary Examiner*—David R. Vincent
(74) *Attorney, Agent, or Firm*—Finnegan, Henderson, Farabow, Garrett & Dunner, L.L.P.

(57) ABSTRACT

In a multicast cell counting methodology, the use of banked memories for enqueuing and dequeuing a multicast cell count value spreads the memory accesses over multiple memories, yielding a reduction in the number of per memory accesses per cell cycle. A cell count value, representing the number of cell copies to be multicast, is written to a first memory on a cell enqueue, and retrieved from the first memory after a first cell dequeue. The cell count value is decremented to reflect the first cell dequeue, and transferred to a second memory.

13 Claims, 5 Drawing Sheets

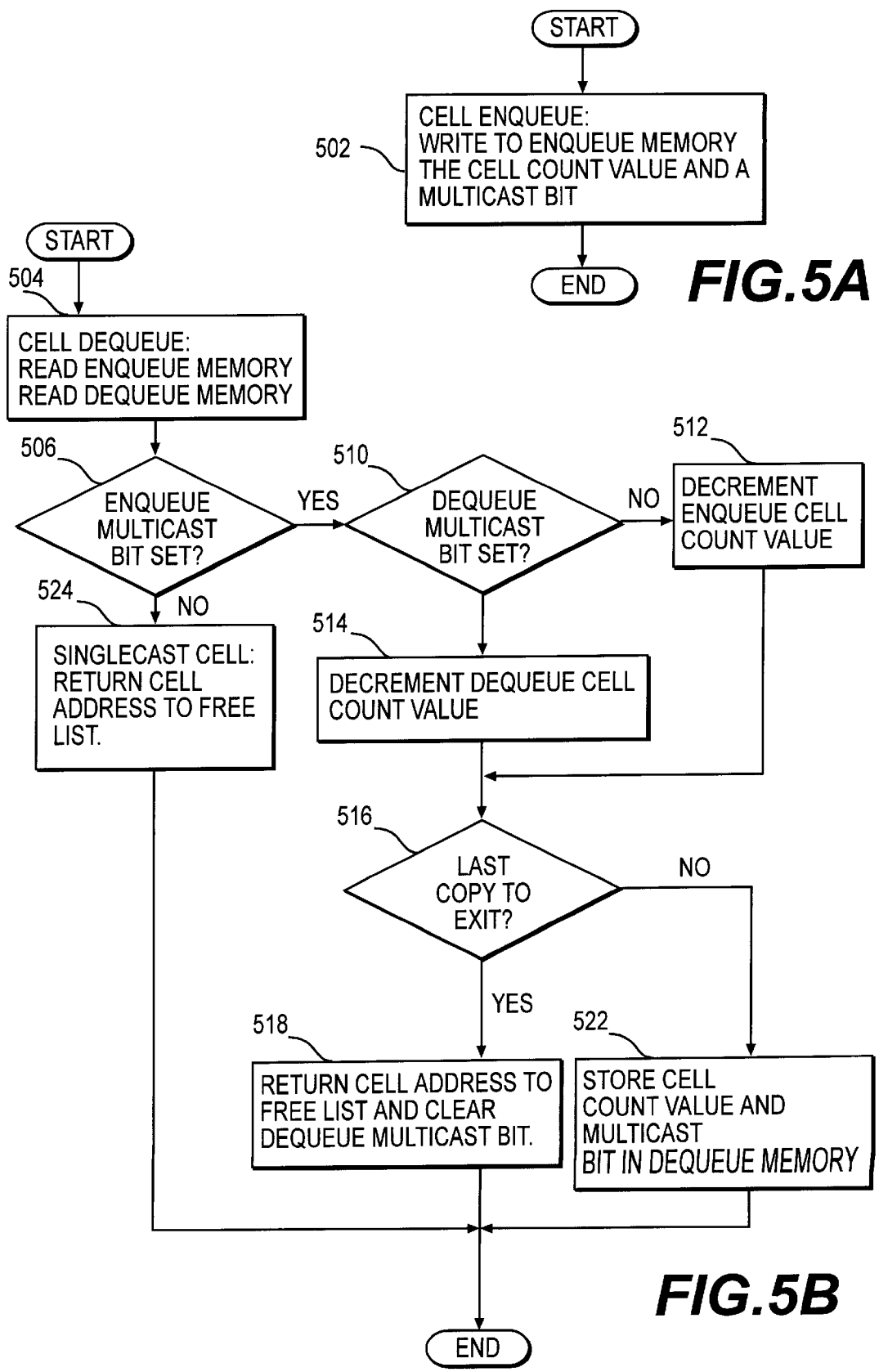

ATM SWITCH WHICH COUNTS MULTICAST CELL COPIES AND USES A SECOND MEMORY FOR A DECREMENTED CELL COUNT VALUE

BACKGROUND OF THE INVENTION

The present invention relates to multicasting in a data processing network and, more particularly, to a method and apparatus for banked multicast common memory switches for use in an asynchronous transfer mode (ATM) network.

ATM networks pass data in the form of cells. The cells, which are of fixed size, pass through one or more switches on the way to a specified destination which may be another switch, a terminal, or some other component in the network. An individual cell may need to be sent to several different destinations in the network from a single switch.

For purposes of this discussion, the term "multicasting" refers to the distribution of a cell to multiple destinations. When multicast, an individual cell is copied in a switch, and the copies are sent to multiple destinations from the switch. In a common memory switch, the cell copying operation can be efficiently achieved by storing the cell in memory and generating multiple copies of the cell memory location (the cell address). Each copy of the cell address is stored at an output queue of the switch. A count of the number of copies of the cell made and transmitted is stored in a count memory. As copies of the cell exit the switch, the count memory is decremented. When the last cell copy is issued, the count memory is reduced to zero ("0"). At this point the address can be reused for another cell and is returned to a list of free memory locations.

Referring now to FIG. 1, there is shown a block diagram of common memory switch 100 capable of performing multicasting. As shown, switch 100 includes a data store 102, which acts as a central buffer where incoming cells 104 are stored. Common memory switch 100 also contains a multicast count memory 106, which may be used to keep track of the number of copies of the cell produced for purposes of maintaining a list of free memory address spaces in the data store 102.

Known multicast cell counting implementations use a single memory to count the cell copies exiting the memory switch. FIG. 2 is useful for discussing the single memory multicast count implementation. This implementation requires several memory operations to track cell copies. The cell count value is written to the memory on enqueue, i.e., when a cell enters the switch (step 200). When the cell leaves the switch, the cell count value is read (step 202) from the multicast count memory and decremented (step 204). The decremented count value is then written to and stored in the multicast count memory (step 206). A cell count value of zero indicates all cell copies have been transmitted from the switch to the intended destinations.

This approach thus requires three memory accesses on the memory per cell cycle. For purposes of this discussion, a cell "cycle" is the enqueuing of a single cell to a switch and the subsequent dequeuing of that cell from the switch. Since three memory accesses are performed for each cell arrival, the memory must function generally three times as fast as the cell arrival rate. This performance requirement for the memory greatly limits the types of memory that can successfully perform the task of multicast counting in common memory switches. Generally, only small, fast memories are capable of supporting multicasting. This limits the capacity of the switch or restricts the number of memory locations that can be used for multicast cells, as the multicast counting operation is the most demanding (in terms of memory bandwidth) in a common memory switch.

It is, therefore, desirable to provide a method and apparatus for multicasting incorporating a cell counting strategy having a reduced number of per-memory accesses. Such a method and apparatus for multicasting would in turn feature a memory capable of operating at a reduced speed relative to the cell arrival rate compared to existing implementations, broadening the variety of memories available for performing multicast cell counting. The ability to use a wider variety of memories yields cost savings and allows higher capacity switches to be built.

SUMMARY OF THE INVENTION

The present invention satisfies this and other desires by providing banked memories for tracking cell copies during multicasting.

A method for counting multicast cell copies in a switch in an ATM network consistent with the present invention includes the steps of writing a cell count value to a first memory on a cell enqueue, and retrieving the cell count value from the first memory after a first cell dequeue. The method further includes the steps of decrementing the cell count value to reflect the first cell dequeue, and transferring the decremented cell count value to a second memory.

Apparatus and networks are also provided for carrying out methods consistent with the present invention.

The advantages accruing to the present invention are numerous. For example, the use of separate memories for enqueuing and dequeuing a multicast cell count value spreads the memory accesses over multiple memories, yielding a reduction in the number of per memory accesses per cell cycle. This, in turn, lowers the memory speed requirement.

The above desires, other desires, features, and advantages of the present invention will be readily appreciated by one of ordinary skill in the art from the following detailed description of the preferred implementations when taken in connection with the accompanying drawings.

BRIEF DESCRIPTION OF THE DRAWINGS

FIGS. 5a–5b are flowcharts detailing the steps for a banked memory multicast counting implementation consistent with the present invention.

DETAILED DESCRIPTION OF THE PREFERRED EMBODIMENTS

Consistent with the present invention, fewer memory accesses per memory per cycle are required to keep an accurate cell count for multicasting, thereby lowering the memory bandwidth requirement of the multicast count memory in a common memory switch. In one implementation, memories are banked such that only two memory accesses per memory cycle are required, thereby lower the operating speed of the multicast memory from three times the cell arrival rate (as with existing implementations) to only two times the cell arrival rate. This permits the use of a greater assortment of memories for the multicast count memory since relatively slower memories can be used. The type of operation performed, and the memory on which the operation is performed, is determined at least in part by the state of a multicast bit stored in one of the memories.

Figure 1:
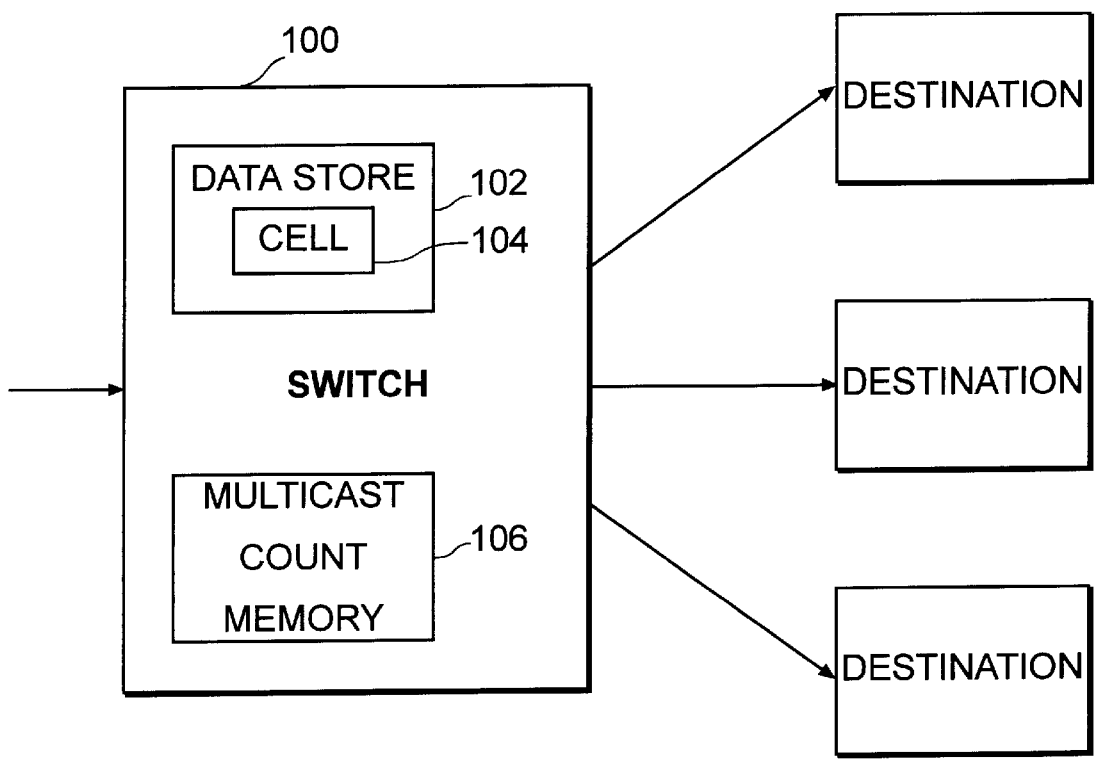
FIG. 1 is a block diagram of a common memory switch for use with the present invention.
Figure 2:
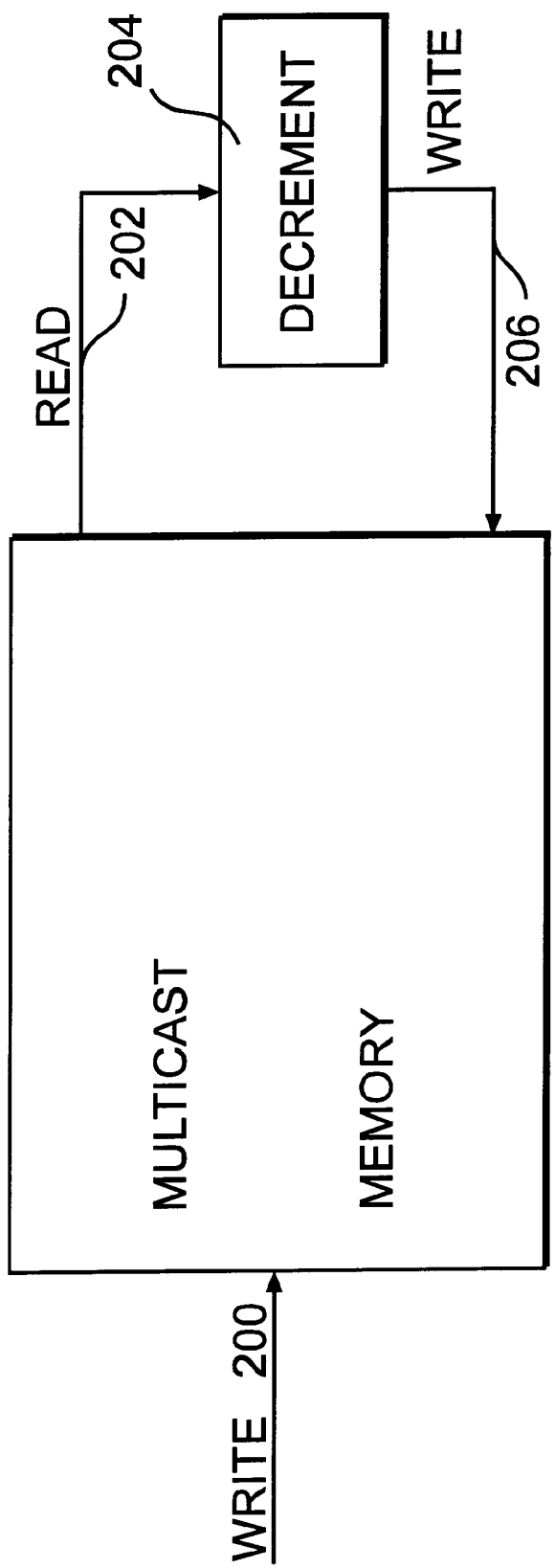
FIG. 2 is a block diagram of a prior art single memory multicast counting implementation.
Figure 3:
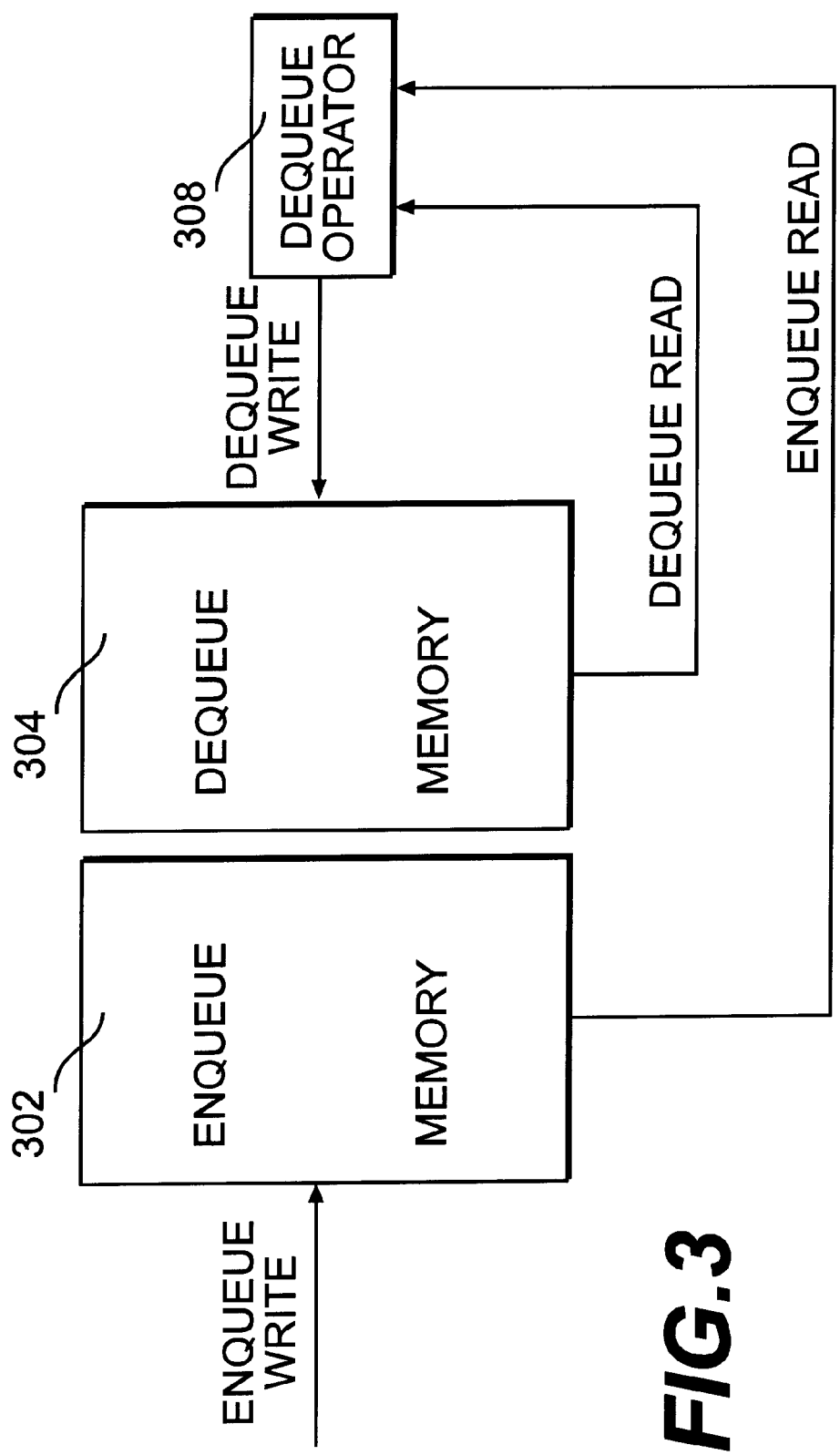
FIG. 3 is a block diagram of a banked memory multicast count implementation consistent with the present invention.

FIG. 3 depicts one such banked memory implementation consistent with the present invention. Generally, the required memory bandwidth, i.e., operations per memory per cycle, is reduced by separating the enqueue and dequeue functions. In particular, the multicast memory is separated into two different memories, an enqueue memory 302 and a dequeue memory 304. These dual memories, which can reside in a switch such as switch 100 shown in FIG. 1, work in conjunction to keep a multicasting cell count, as described in greater detail below. The bandwidth reduction is attained by spreading the memory accesses necessary to count the cell copies between enqueue memory 302 and dequeue memory 304. In one embodiment, a multicast bit is attached to a cell count value to allow use of banked memories.

Figure 4:
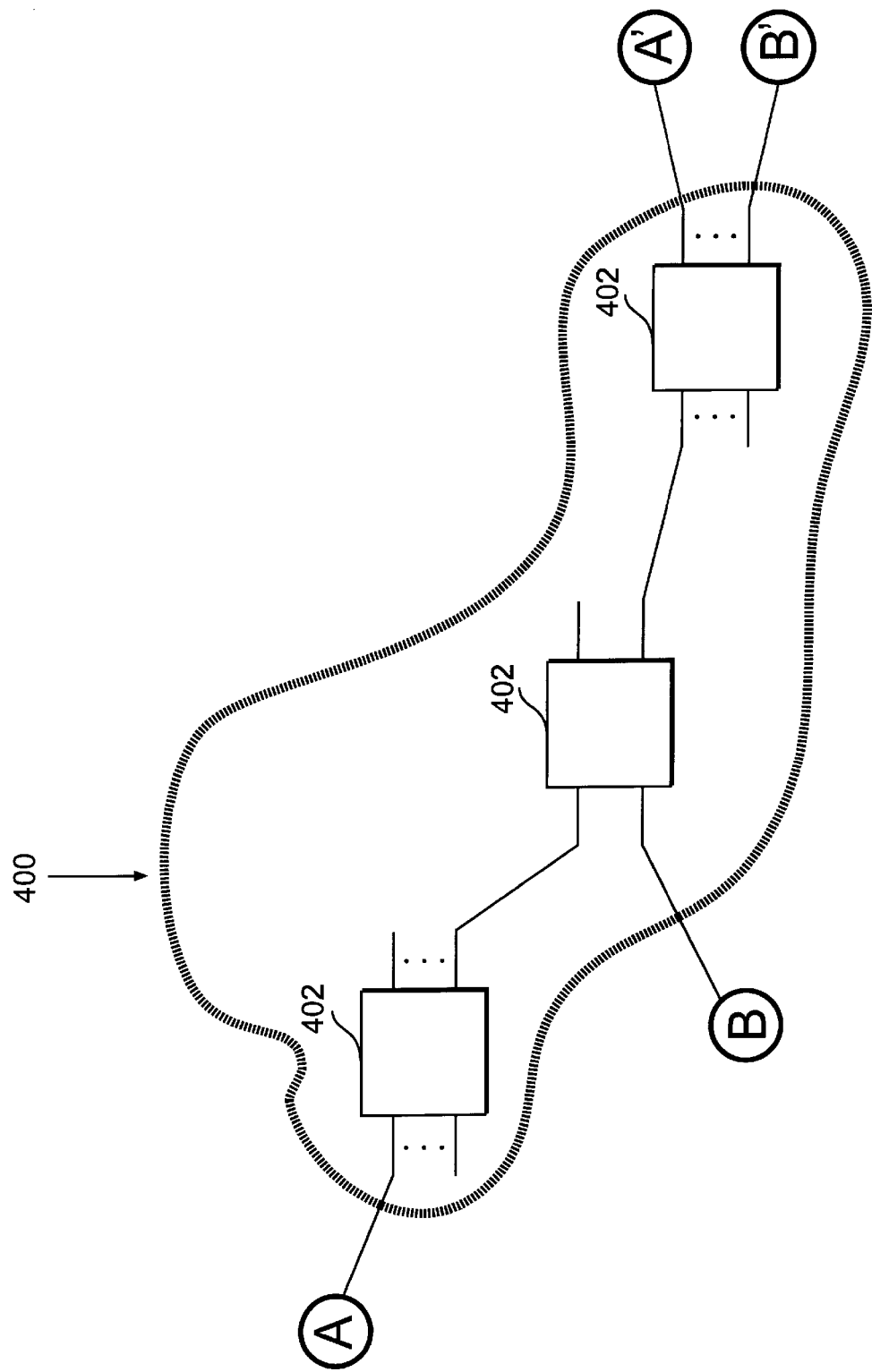
FIG. 4 is a high level block diagram of a network for use with method and systems consistent with the present invention.

FIG. 4 illustrates a high level communications network, shown generally by reference numeral 400, within which the method and apparatus for banked memory multicasting consistent with the present invention may function. As shown, a plurality of end nodes A, B, A', and B' connect to the network and serve as the sources and sinks of network traffic, i.e., cells. As previously noted, these cells in turn pass through one or more network switches 402, only three of which are shown for the sake of clarity, on their way to specified destinations. Of course, one of skill will appreciate that the particular configuration of switches and nodes in FIG. 4 is illustrative, and that the number, layout, and interconnection of switches and nodes in an actual network may vary.

Details of the various operations performed on the enqueue memory 302 and dequeue memory 304 (see FIG. 3), e.g., enqueue/dequeue writes to the memories and enqueue/dequeue reads from the memories, are discussed in conjunction with a description of the detailed flowchart for banked multicasting shown in FIGS. 5a–5b. Generally, a cell count value representing the number of cell copies to be distributed from the switch is written to the enqueue memory, transferred to the dequeue memory when the first copy of the cell leaves the switch, then modified in the dequeue memory when subsequent copies of the cell leave the switch. Modification of the cell count value in the dequeue memory generally entails reading the value, decrementing it, and storing the new value back in the dequeue memory. Each time a copy of the cell leaves the switch, i.e., each cell dequeue, the cell count value is tested to determine if that cell was the last copy to leave the switch.

As shown in FIG. 5a, each time a cell is enqueued (each time a cell enters the switch), an enqueue write operation is performed on the enqueue memory 302. This operation entails writing the cell count value—the number of times the cell is to leave the memory switch—along with an enqueue multicast bit to the enqueue memory (step 502). The enqueue multicast bit is used to indicate the multicast status of the cell. If the multicast bit is set (value=1) the cell in the data store is to be multicasted. If not, the cell is a singlecast cell, i.e., the cell will be sent to only a single destination.

Referring now to FIG. 5b, each time a cell is dequeued (each time a cell leaves the switch), a dequeue operator 308, shown in FIG. 3, performs an enqueue read operation on enqueue memory 302 and a dequeue read operation on dequeue memory 304 to obtain the enqueue cell count value, the enqueue multicast bit, the dequeue cell count, and the dequeue multicast bit (step 502). Dequeue operator 308 is a hardware component which, for example, consists of a memory access element and a decrement function. Dequeue operator 308, which may reside in the switch, performs various read and write operations on the banked memories when cells are dequeued.

With additional reference to FIG. 3, the dequeue operator 308 first determines whether the enqueue multicast bit is set (step 506). If the enqueue multicast bit is set, the cell is to be multicast, and the dequeue operator 308 determines the value of the dequeue multicast bit (step 510). In the preferred embodiment, the dequeue multicast bit had been initialized to a value of zero ("0") prior to cell enqueue. As such, the test of the dequeue multicast bit (step 510) fails, indicating this copy of the cell was the first copy to exit the switch, and the dequeue operator 308 decrements the enqueue cell count value (step 512).

The dequeue operator 308 then determines if the last copy of the cell has been transmitted from the switch (step 516). This operation entails checking the cell count value. If it is zero ("0"), the last cell has left the switch. The dequeue multicast bit is cleared, i.e., set to zero, and the memory address used to store the cell is returned to the free list (step 518), a list of available addresses maintained by the free list manager, a hardware component in the switch. If the dequeued cell was not the last copy to leave the switch, the enqueue cell count and multicast bit are written to the dequeue memory (step 522), and the dequeue multicast bit is set by writing the value of the enqueue multicast bit (which has a value of "1") to the dequeue memory. The dequeue multicast bit thus takes on the value of the enqueue multicast bit which, at this point, is "1," i.e., the dequeue multicast bit is set.

If, at step 510, the dequeue operator determined the dequeue multicast bit is set, the dequeued cell was not the first copy to be transmitted from the switch. The dequeue cell count value (which would have been read at step 504) is decremented by dequeue operator 308 (step 514). The dequeue operator 308 determines if the last copy of the cell has been transmitted from the switch, as described above. Depending on the results of the test, control flow proceeds to either step 518 or 522.

If the dequeue operator determines on cell dequeue the enqueue multicast bit is not set (step 506), the dequeued cell was a singlecast cell, i.e., it was to be transmitted to a single destination. Since the cell has already been transmitted toward its intended destination, no further memory operations are required, and the cell address in the data store is returned to the free list (step 524).

In summary, on dequeue of a multicast cell, the dequeue operator perform read operations on two separate memories. The dequeue operator maintains a count of the cells to be multicast using a cell count value stored in both of the two memories. Memory accesses are spread between the two memories depending on the status of a multicast bit. For each cell cycle, there are two read operations (step 504) and two write operations (steps 502 and 522) performed on enqueue memory 302 and dequeue memory 304. While this results in a total of four memory accesses (one greater than with the prior art implementation), each memory is only accessed twice (compared with the single memory being accessed three times in the prior art implementation). Thus, the separation of the multicast memory into two memories consistent with the present invention reduces the number of memory accesses per memory per cycle. This memory access reduction of the in turn reduces the speed at which the memory must be able to function from three times the cell arrival rate in the prior art implementation to only twice the cell arrival rate consistent with the present invention.

The present invention thus permits the specification of slower memories for use as multicast count memories in a switch. Speed constraints of external memories, which tend to be larger and slower than the smaller and faster internal memories associated with prior art implementations, become less of a problem. Numerous advantages flow from the ability to use a wider variety of memories, not the least of which are cost savings and improved performance.

It will be appreciated by those skilled in this art that various modifications and variations can be made to the banked memory multicast strategy consistent with the present invention described herein without departing from the spirit and scope of the invention. Other embodiments of the invention will be apparent to those skilled in this art from consideration of the specification and practice of the invention disclosed herein. It is intended that the specification and examples be considered exemplary only, with a true scope and spirit of the invention being indicated by the following claims.

What is claimed is:

1. A method for counting multicast cell copies in a switch in an ATM network, the switch having two multicast cell count memories, the method comprising the steps of:
    writing a cell count value to a first memory on a cell enqueue;
    retrieving the cell count value from the first memory after a first cell dequeue;
    decrementing the cell count value to reflect the first cell dequeue; and
    transferring the decremented cell count value to a second memory.

2. The method of claim 1 wherein the step of writing a cell count value to a first memory includes the substep of writing a multicast bit to the first memory, the step of retrieving the cell count value from the first memory includes the substep of retrieving the multicast bit from the first memory after a first cell dequeue, and wherein the step of transferring the decremented cell count value includes the substep of transferring the multicast bit to the second memory.

3. The method of claim 2 further comprising the steps of:
    reading the decremented cell count value from the second memory after a second cell dequeue;
    decrementing one of the cell count values stored in the first and second memories to reflect the second cell dequeue; and
    transferring the decremented cell count value to the second memory.

4. The method of claim 1 wherein the cell count value represents the number of copies of the cell to be transmitted from the switch.

5. The method of claim 3 wherein the step of reading the decremented cell count value includes the substep of reading the multicast bit from the second memory, and wherein the step of decrementing includes the substeps of decrementing the cell count value stored in the first memory if the multicast bit is not set and decrementing the cell count value stored in the second memory if the multicast bit is set, the method further comprising the step of storing the decremented count value in the second memory.

6. A system for counting multicast cell copies in a switch in an ATM network, the switch having two multicast cell count memories, the system comprising:
    means for writing a cell count value to a first memory on a cell enqueue;
    means for retrieving the cell count value from the first memory after a first cell dequeue;
    means for decrementing the cell count value to reflect the first cell dequeue; and
    means for transferring the decremented cell count value to a second memory.

7. The system of claim 6 wherein the means for writing a cell count value to a first memory includes means for writing a multicast bit to the first memory, the means for retrieving the cell count value from the first memory includes means for retrieving the multicast bit from the first memory after a first cell dequeue, and wherein the means for transferring the decremented cell count value includes means for transferring the multicast bit to the second memory.

8. The system of claim 7 further comprising:
    means for reading the decremented cell count value from the second memory after a second cell dequeue;
    means for decrementing one of the cell count values stored in the first and second memories to reflect the second cell dequeue; and
    means for transferring the decremented cell count value to the second memory.

9. The system of claim 6 wherein the cell count value represents the number of copies of the cell to be transmitted from the switch.

10. The system of claim 8 wherein the means for reading the decremented cell count value includes means for reading the multicast bit from the second memory, and wherein the means for decrementing includes means for decrementing the cell count value stored in the first memory if the multicast bit is not set and decrementing the cell count value stored in the second memory if the multicast bit is set, the system further comprising means for storing the decremented count value in the second memory.

11. A communications network comprising:
    a plurality of nodes sending and receiving cells; and
    a switch interconnecting the nodes, the switch including
        means for writing a cell count value to a first memory on a cell enqueue;
        means for retrieving the cell count value from the first memory after a first cell dequeue;
        means for decrementing the cell count value to reflect the first cell dequeue; and
        means for transferring the decremented cell count value to a second memory.

12. The network of claim 11 wherein the means for writing a cell count value to a first memory includes means for writing a multicast bit to the first memory, the means for retrieving the cell count value from the first memory includes means for retrieving the multicast bit from the first memory after a first cell dequeue, and wherein the means for transferring the decremented cell count value includes means for transferring the multicast bit to the second memory.

13. The network of claim 12 wherein the switch further comprises:
    means for reading the decremented cell count value from the second memory after a second cell dequeue;
    means for decrementing one of the cell count values stored in the first and second memories to reflect the second cell dequeue; and
    means for transferring the decremented cell count value to the second memory.

* * * * *